(12) United States Patent
VanBlon et al.

(10) Patent No.: US 10,955,988 B1
(45) Date of Patent: Mar. 23, 2021

(54) EXECUTION OF FUNCTION BASED ON USER LOOKING AT ONE AREA OF DISPLAY WHILE TOUCHING ANOTHER AREA OF DISPLAY

(71) Applicant: Lenovo (Singapore) Pte. Ltd., Singapore (SG)

(72) Inventors: Russell Speight VanBlon, Raleigh, NC (US); Arnold S. Weksler, Raleigh, NC (US); Nathan J. Peterson, Oxford, NC (US); John Carl Mese, Cary, NC (US); Mark Patrick Delaney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/791,888

(22) Filed: Feb. 14, 2020

(51) Int. Cl.
G06F 3/0481 (2013.01)
G06F 3/01 (2006.01)
G06T 7/73 (2017.01)
G06F 16/93 (2019.01)
G06F 3/0488 (2013.01)

(52) U.S. Cl.
CPC .......... *G06F 3/04815* (2013.01); *G06F 3/013* (2013.01); *G06F 3/017* (2013.01); *G06F 3/0488* (2013.01); *G06F 3/04817* (2013.01); *G06F 16/94* (2019.01); *G06T 7/74* (2017.01)

(58) Field of Classification Search
None
See application file for complete search history.

(56) References Cited

U.S. PATENT DOCUMENTS

| 2,510,344 A | 6/1950 | Law |
| 2,567,654 A | 9/1951 | Jan |
| 3,418,426 A | 12/1968 | Herbert et al. |
| 3,628,854 A | 12/1971 | Jampolsky |
| 4,082,433 A | 4/1978 | Appeldorn et al. |
| 4,190,330 A | 2/1980 | Berreman |
| 4,577,928 A | 3/1986 | Brown |

(Continued)

FOREIGN PATENT DOCUMENTS

| DE | 69937592 | 10/2008 |
| DE | 10310794 | 10/2012 |

(Continued)

OTHER PUBLICATIONS

"Relationship Between Inches, Picas, Points, Pilch, and Twips", Article ID: 76388; http://support2.microsoft.com/KB/76388.

(Continued)

*Primary Examiner* — Frank S Chen
(74) *Attorney, Agent, or Firm* — John M. Rogitz; John L. Rogitz (57) ABSTRACT

In one aspect, a device includes at least one processor, a display accessible to the at least one processor, and storage accessible to the at least one processor. The storage includes instructions that may be executable by the at least one processor to determine that a user is looking at a graphical object presented at a first area of the display that is different from a second area of the display that the user is touching concurrently with looking at the first area. The instructions may also be executable to, based on the determination, execute a function associated with selection of the graphical object.

20 Claims, 6 Drawing Sheets

(56) References Cited

U.S. PATENT DOCUMENTS

| | | |
|---|---|---|
| 5,514,861 A | 5/1996 | Swartz et al. |
| 5,579,037 A | 11/1996 | Tahara et al. |
| 5,581,484 A | 12/1996 | Prince |
| 5,583,702 A | 12/1996 | Cintra |
| 6,046,847 A | 4/2000 | Takahashi |
| 6,607,134 B1 | 8/2003 | Bard et al. |
| 6,822,639 B1 | 11/2004 | Silverbrook et al. |
| 8,570,273 B1 | 10/2013 | Smith |
| 2003/0214481 A1 | 11/2003 | Xiong |
| 2004/0160419 A1 | 8/2004 | Padgitt |
| 2004/0169638 A1 | 9/2004 | Kaplan |
| 2005/0116929 A1 | 6/2005 | Molander et al. |
| 2005/0257166 A1 | 11/2005 | Tu |
| 2006/0001656 A1 | 1/2006 | LaViola et al. |
| 2006/0012567 A1 | 1/2006 | Sicklinger |
| 2006/0061663 A1 | 3/2006 | Park |
| 2006/0139175 A1 | 6/2006 | Cosier |
| 2006/0267957 A1 | 11/2006 | Kolmykov-Zotov et al. |
| 2006/0267958 A1 | 11/2006 | Kolmykov-Zotov et al. |
| 2006/0282574 A1 | 12/2006 | Zotov et al. |
| 2007/0063992 A1 | 3/2007 | Lundquist |
| 2007/0262958 A1 | 11/2007 | Cai et al. |
| 2008/0136775 A1 | 6/2008 | Conant |
| 2009/0065578 A1 | 3/2009 | Peterson et al. |
| 2009/0146951 A1 | 6/2009 | Welland |
| 2009/0204410 A1 | 8/2009 | Mozer et al. |
| 2009/0259349 A1 | 10/2009 | Golenski |
| 2009/0315740 A1 | 12/2009 | Hildreth et al. |
| 2009/0322685 A1 | 12/2009 | Lee |
| 2010/0053082 A1 | 3/2010 | Hu et al. |
| 2010/0079508 A1 | 4/2010 | Hodge et al. |
| 2010/0156783 A1 | 6/2010 | Bajramovic |
| 2010/0171720 A1 | 7/2010 | Craig et al. |
| 2010/0201625 A1 | 8/2010 | Urbach |
| 2010/0211918 A1 | 8/2010 | Liang et al. |
| 2011/0007035 A1 | 1/2011 | Shai |
| 2011/0065451 A1 | 3/2011 | Danado et al. |
| 2011/0210931 A1 | 9/2011 | Shai |
| 2012/0075173 A1 | 3/2012 | Ashbrook et al. |
| 2012/0086636 A1 | 4/2012 | Chen |
| 2012/0092277 A1 | 4/2012 | Momchilov |
| 2012/0126972 A1 | 5/2012 | Rott et al. |
| 2012/0149309 A1 | 6/2012 | Hubner et al. |
| 2012/0220311 A1 | 8/2012 | Rodriguez et al. |
| 2012/0268268 A1 | 10/2012 | Bargero |
| 2013/0016064 A1 | 1/2013 | Lee |
| 2013/0021459 A1 | 1/2013 | Vasilieff et al. |
| 2013/0044042 A1 | 2/2013 | Olsson et al. |
| 2013/0053107 A1 | 2/2013 | Kang et al. |
| 2013/0135233 A1 | 5/2013 | Wang et al. |
| 2013/0145304 A1 | 6/2013 | Deluca et al. |
| 2013/0170755 A1 | 7/2013 | Dalton et al. |
| 2013/0246663 A1 | 9/2013 | Raveendran et al. |
| 2013/0307769 A1 | 11/2013 | Sharma et al. |
| 2013/0307771 A1 | 11/2013 | Parker et al. |
| 2014/0132410 A1 | 5/2014 | Chang |
| 2014/0132512 A1 | 5/2014 | Sainz-Garcia |
| 2014/0176813 A1 | 6/2014 | Conness et al. |
| 2014/0184550 A1 | 7/2014 | Hennessey et al. |
| 2014/0204029 A1 | 7/2014 | Lopez et al. |
| 2014/0247232 A1 | 9/2014 | George-Svahn et al. |
| 2014/0285416 A1 | 9/2014 | Priyantha et al. |
| 2014/0317524 A1 | 10/2014 | VanBlon et al. |
| 2015/0067560 A1 | 3/2015 | Cieplinski et al. |
| 2015/0067580 A1 | 3/2015 | Um et al. |
| 2015/0130740 A1 | 5/2015 | Cederlund et al. |
| 2015/0178861 A1* | 6/2015 | Gordon ............... G06Q 10/103 705/301 |
| 2015/0304251 A1 | 10/2015 | Greenberg et al. |
| 2016/0128568 A1 | 5/2016 | Bellamy et al. |
| 2016/0253070 A1* | 9/2016 | Rolih .................. G06T 13/80 715/835 |
| 2019/0268463 A1* | 8/2019 | Lu ....................... G06F 1/3218 |

FOREIGN PATENT DOCUMENTS

| | | |
|---|---|---|
| EP | 0880090 A2 | 11/1998 |
| WO | 2004051392 A2 | 6/2004 |

OTHER PUBLICATIONS

"Understanding & Using Directional Microphones", http://www.soundonsound.com/sos/sepOO/articles/direction.htm; Published in SOS Sep. 2000.

Arthur Davis, Frank Kuhnlenz, "Optical Design Using Fresnel Lenses, Basic Principles and some PracticalExamples" Optik & Photonik, Dec. 2007.

Darren Quick, "PixelOptics to Launch 'world's first electronic focusing eyewear'", http://www.gizmag.com/pixeloptics-empower-electroni-focusing-glasses/17569/. Jan. 12, 2011.

Extron, "Digital Connection, Understanding EDID—Extended Display Identification Data", Fall 2009, www.extron.com.

I Source: "Raise to Speak Makes Siri Wonderfully Useful (Once You Know How to Use II)", http:///isource.com/10/01/raise-to-speak-makes-siri-wonderfully-useful-once-you-know-how-to-use-il./.

Insight News, "Electronic-lens company PixelOptics is bankrupt", http://www.insightnews.com.au/_blog/NEWS_NOW!/post/lens/electronic-lens-company-pixeloptics-is-bankrupt/. Dec. 12, 2013.

Logitech, Customizing Mouse Buttons with Logitech Control Center Software, http://support.logitech.com/en_us/article/26975,published 2014, pp. 1-3. (Year: 2014).

Superfocus, "See The World in Superfocus Revolutionary Eyeglasses Give You the Power To Focus Your EntireView AI Any Distance", http://superfocus.com/eye-care-practitioners.

Tactus Technology, "Taking Touch Screen Interfaces Into a New Dimension", 2012 (13 pages).

Thalmiclabs, "Myo Gesture Control Armband" http://www.lhalmic.com/en/myo.

Thalmiclabs, "Myo-Tech Specs", http://www.lhalmic.com/en/myo/lechspecs.

Wacom, Pen Display Software User's Manual, Version 1.0, Jun. 12, 2008, pp. 1-8. (Year: 2008).

Wikepedia, "Smart Glass" Definition, http://en.wikipedia.org/wiki/Smart_glass.

Wikipedia, "Beamforning", definition; http://en.wikipedia.org/wiki/Beamforming.

Wikipedia, "Electromyography", definition; http://en.wikipedia.org/wiki/Electromyogrpahy.

Wikipedia, "Extended Display Identification Data", Definition; http://en.wikipedia.org/wiki/Extended_display_Identification_dala.

Wikipedia, "Microphone array", definition, http://en.wikipedia.org/wiki/Microphone_array.

Wikipedia, "Microphone", definition; http://en.wilipedia.org/wkik/microphone.

Wikipedia, "Polarizer" Definition; http://en.wikipedia.org/wiki/Polarizer.

* cited by examiner

EXECUTION OF FUNCTION BASED ON USER LOOKING AT ONE AREA OF DISPLAY WHILE TOUCHING ANOTHER AREA OF DISPLAY

FIELD

The present application relates to technically inventive, non-routine solutions that are necessarily rooted in computer technology and that produce concrete technical improvements.

BACKGROUND

As recognized herein, the displays of computing devices such as smart phones and smart watches are becoming increasingly small, yet many of those displays can still present a significant amount of information. As also recognized herein, however, a problem may arise in situations where a user might wish to select an item presented on one of those relatively small displays using touch input but cannot accurately select it without inadvertently selecting an adjacent item and/or without burdensomely zooming in on the desired item. There are currently no adequate solutions to the foregoing computer-related, technological problem arising in the realm of computer operation.

SUMMARY

Accordingly, in one aspect a device includes at least one processor, a display accessible to the at least one processor, a camera accessible to the at least one processor, and storage accessible to the at least one processor. The storage includes instructions executable by the at least one processor to present a first graphical object on the display at a first location, receive input from the camera, execute eye tracking using the input from the camera, and identify a user as looking at the first graphical object at the first location based on the eye tracking. The instructions are also executable to receive touch input to the display at a second location that is different from the first location and to execute a function associated with selection of the first graphical object based on the touch input and based on the identification of the user as looking at the first graphical object at the first location.

In some implementations, the instructions may be executable to determine that the second location is at least a threshold distance away from at least a portion of the first location. In these implementations, the instructions may then be executable to execute the function associated with selection of the first graphical object based on the determination that the second location is at least the threshold distance away from at least the portion of the first location and based on the identification of the user as looking at the first graphical object at the first location.

Also in some implementations, the instructions may be executable to identify a gesture by the user to move a body part of the user away from the first location. In these implementations, the instructions may then be executable to execute the function associated with selection of the first graphical object based on the identification of the gesture by the user to move the body part of the user away from the first location and based on the identification of the user as looking at the first graphical object at the first location. The gesture may be identified based on input from the camera and/or based on input from the display.

Furthermore, in some specific implementations the instructions may be executable to first identify a body part of the user as hovering over at least a portion of the first location and then to identify a gesture by the user to move the body part away from hovering over the portion of the first location. The instructions may then be executable to execute the function based on the identification of the gesture by the user to move the body part away from the first location and based on the identification of the user as looking at the first graphical object at the first location.

Still further, in some implementations the instructions may also be executable to determine that a threshold number of graphical objects are presented within an area of the display, where the area includes at least a portion of the first location but does not include the entire area of the display on which images are presentable. The instructions may then be executable to execute the function based on the determination that the threshold number of graphical objects are located within the area, the touch input, and the identification of the user as looking at the first graphical object at the first location. The threshold number itself may be greater than one (e.g., three).

Additionally, in some implementations the instructions may be executable to execute the function without magnifying or zooming in on at least a portion of the first location relative to the initial presentation of the first graphical object at the first location. The function itself may include one or more of presenting a web page associated with the first graphical object, presenting a document associated with the first graphical object, launching an application associated with the first graphical object, selecting text establishing at least a portion of the first graphical object, and selecting an input field establishing at least a portion of the first graphical object. The first graphical object itself may include a hyperlink, text, an input field, an icon selectable to launch an application, an icon selectable to present a document, and a button presented as part of an application or website.

In another aspect, a method includes presenting a first graphical object on a touch-enabled display of a device, with the first graphical object being presented at a first area on the touch-enabled display. The method also includes receiving input from a camera, executing eye tracking using the input from the camera, and identifying that a user is looking at the first graphical object based on the eye tracking. The method also includes receiving touch input to the touch-enabled display at a second area of the touch-enabled display, where the second area does not include the first area. The method then includes executing a function associated with selection of the first graphical object based on the touch input and based on the identifying that the user is looking at the first graphical object.

In some implementations, the method may include executing the function associated with selection of the first graphical object based on the touch input and based on identifying that the user is looking at the first graphical object at the same time that the touch input is received.

Also in some implementations, the method may include determining that the second area is at least a threshold distance away from at least a most-proximate portion of the first area. In these implementations, the method may then include executing the function associated with selection of the first graphical object based on the determining that the second area is at least the threshold distance away from at least the most-proximate portion of the first area and based on the identifying that user is looking at the first graphical object.

Also in some implementations, the method may include identifying a gesture by the user to move a body part of the user away from the first area. In these implementations, the method may then include executing the function associated with selection of the first graphical object based on the identifying of the gesture by the user to move the body part of the user away from the first area and based on the identifying that the user is looking at the first graphical object. The gesture may be identified based on input from the camera and/or based on input from the touch-enabled display.

Still further, in some implementations the method may include determining that a threshold number of additional graphical objects are located within a threshold distance of the first area, where the threshold number is greater than one. In these implementations, the method may include executing the function based on the determining that the threshold number of additional graphical objects are located within the threshold distance, the touch input, and the identifying of the user as looking at the first graphical object. If desired, the method may also include declining to execute the function based on the touch input and based on the identifying that the user is looking at the first graphical object based on identifying that the threshold number of additional graphical objects are not located within the predefined distance.

In still another aspect, at least one computer readable storage medium (CRSM) that is not a transitory signal includes instructions executable by at least one processor to determine that a user is looking at a first area of a display that is different from a second area of the display that the user is touching concurrently with looking at the first area. The instructions are also executable to execute a function associated with selection of the first area based on the determination.

In some examples, the instructions may be executable to determine that the second area is at least a threshold distance away from at least a portion of the first area. In these examples, the instructions may then be executable to execute the function associated with selection of the first area based on the determination that the second area is at least the threshold distance away from at least the portion of the first area and based on the determination that user is looking at the first area.

Also in some examples, the instructions may be executable to identify movement of a body part of the user away from the first area and to execute the function associated with selection of the first area based on the identification of the movement of the body part of the user away from the first area and based on the determination that the user is looking at the first area.

The details of present principles, both as to their structure and operation, can best be understood in reference to the accompanying drawings, in which like reference numerals refer to like parts, and in which:

DETAILED DESCRIPTION

The present application discloses systems and methods for a user to look at a graphical object he or she wishes to select, and selecting the graphical object by directing touch input to another location of the display while looking at the graphical object. A function associated with selection of that graphical object may then be executed without magnifying or zooming in on at least a portion of the location where the graphical object is presented. This may be a more accurate and efficient mode of input in certain situations as eye tracking may be more precise for selection of a graphical object than the user using his or her finger. Thus, present principles may be applied in any number of scenarios, such as when controlling a web browser, a mobile device, a settings pane, or another application UI with dense controls.

Furthermore, note that in some examples the touch input may be processed as selecting a graphical object located at a different display location only when the touch input is directed to a "blank" area of the display that does not present other graphical objects or icons other than possibly a background image (e.g., for a home screen). However, in other examples the touch input may be processed as selecting a given graphical object located at a certain display location that is being looked at even if the touch input is directed to another graphical object at another location than the one at which the user is looking.

The function itself that is executed may include, as examples, presenting a web page associated with the looked-at graphical object, presenting a document associated with the looked-at graphical object, launching an application associated with the looked-at graphical object, selecting text establishing at least a portion of the looked-at graphical object (e.g., cutting or copying text), and selecting an input field establishing at least a portion of the looked-at graphical object so that subsequent input may be provided by the user that is to be presented in the input field. The looked-at graphical object itself may be established by, as examples, a hyperlink, text, an input field, an icon selectable to launch an application, an icon selectable to present a document, a button presented as part of an application GUI or website, etc.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), a read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
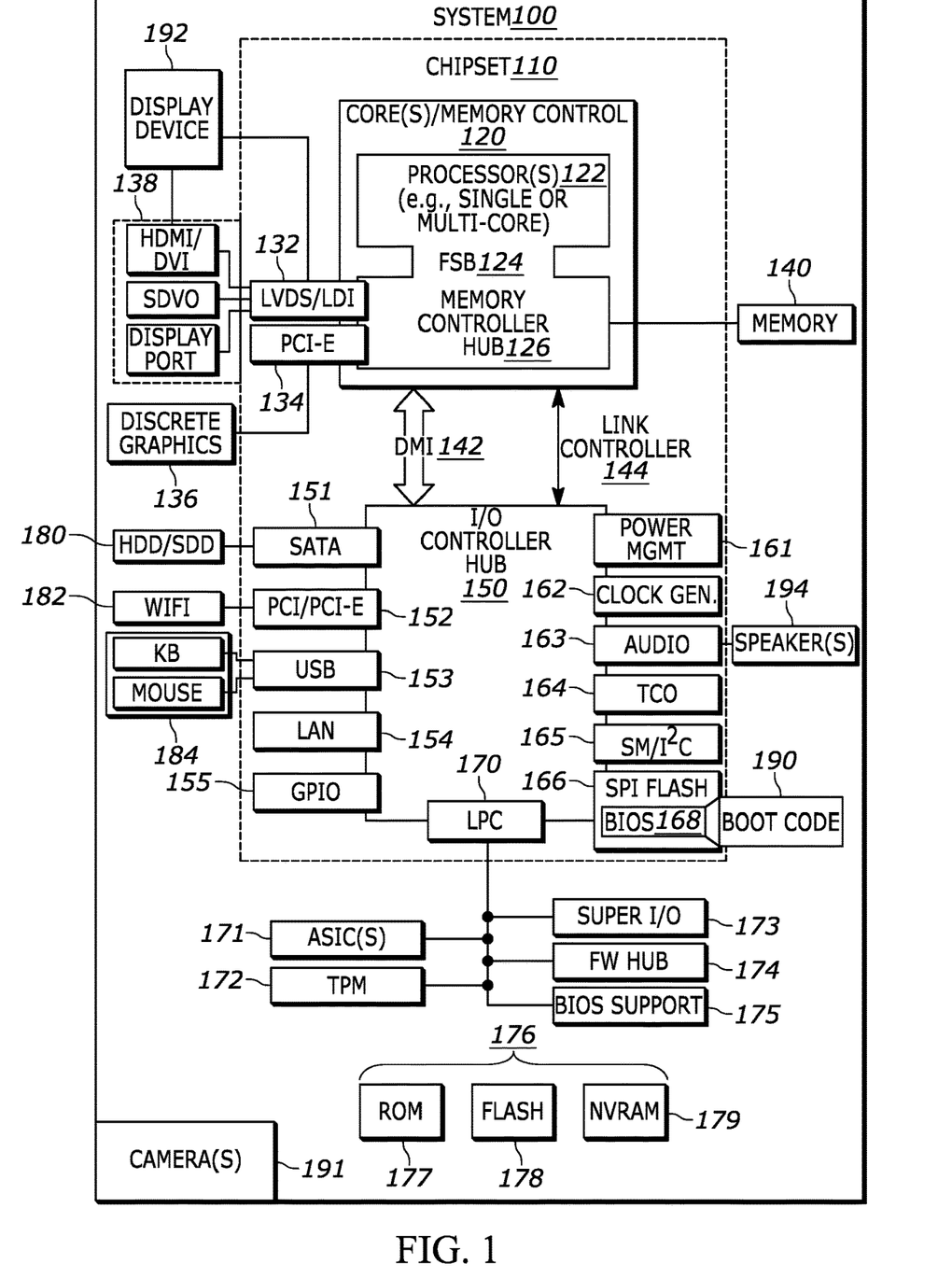
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include one or more cameras 191. The camera(s) 191 may gather one or more images and provide them to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
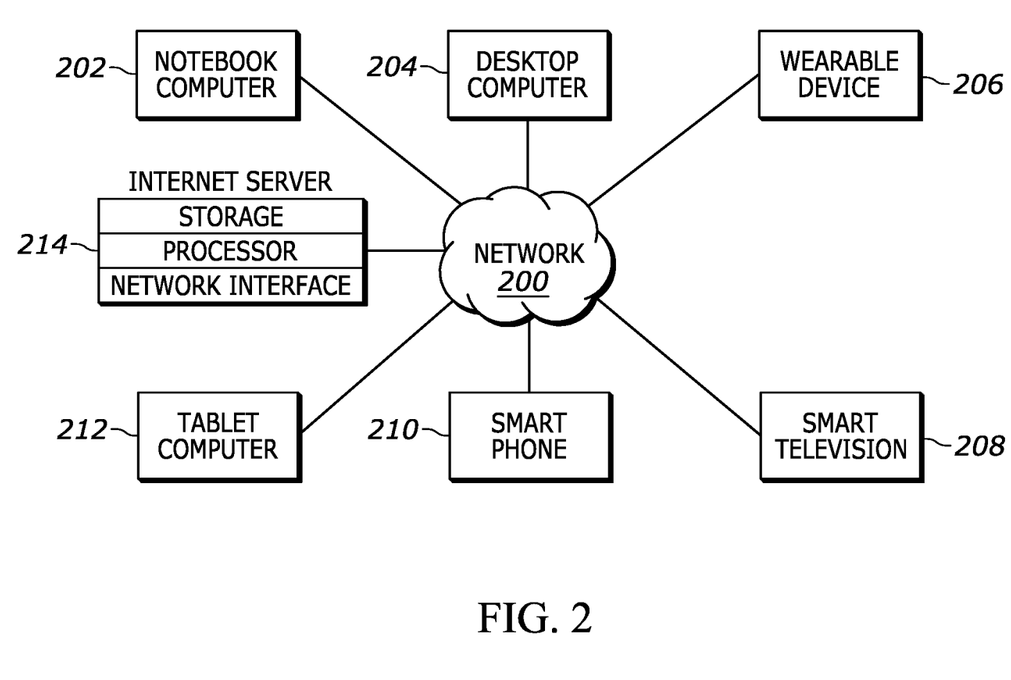
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
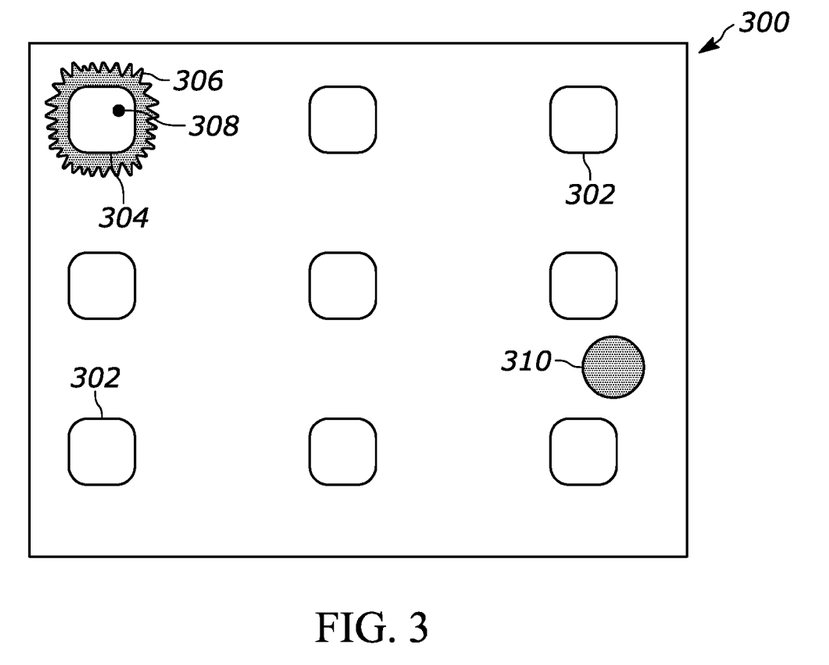
FIGS. 3-5 show example graphical user interfaces (GUIs) that a user may interact with using both eye input and touch input consistent with present principles.

Now referring to FIG. 3, it shows an example graphical user interface (GUI) 300 presented on the touch-enabled display of a device consistent with present principles. In the example shown, the GUI 300 presents plural graphical objects 302 as part of a home screen or applications screen of the device. It is to be understood that each of the objects 302 may be an icon or tile associated with a different respective software application executable by the device, and that selection by a user of one of the objects 302 may cause the respective application to be launched.

As shown, a first graphical object 304 of the plural graphical objects 302 is being highlighted with a halo effect 306 in a certain color (e.g., bright yellow or green) to indicate that the device has identified the user as looking at the graphical object 304. A circle or dot 308 may also be presented that indicates the particular location/area of the display that the device has identified the user as looking at.

As also shown in FIG. 3, an area of the touch-enabled display is being touched by the user, as represented by outlining 310. It is to be understood that the outlining 310 itself may not be presented on the display and simply demonstrates the area of the display being contacted by the user's finger, though in certain examples the outlining 310 may actually be presented on the display to indicate the area being touched. In any case, it may be appreciated that the area represented by the outlining 310 is at least a threshold non-zero distance away from at least a most-proximate portion of the object 306 to the outlining 310 (e.g. the bottom right corner of the object 306 in this case). Based on the user touching the display at the contact area which is at least the threshold distance away while the user is determined to be looking at the object 306, the device may then execute a function associated with selection of the object 306. In this case, the function may be to launch an application associated with the object 306. For example, the object 306 may be an icon associated with a web browser or email application and therefore the function may be to launch the web browser or email application, respectively.

However, also note that in some examples when a user touches a display location/area that is not the same as a graphical object being looked at, but the touch location and graphical object are not at least the threshold distance apart, the device may decline to execute a function associated with selection of the graphical object being looked at (and may, in some examples, instead execute a function associated with the actual display location that is touched). This may help avoid false positives where a user might be looking at one display location but still intend to select another proximate display location with touch input, while still executing the function for the looked-at object in other instances where the touch input is at least the threshold distance away from the looked-at object since touch input at least the threshold distance away would more-clearly establish user intent to select the graphical object being looked at rather than to select the area being touched.

Figure 4:
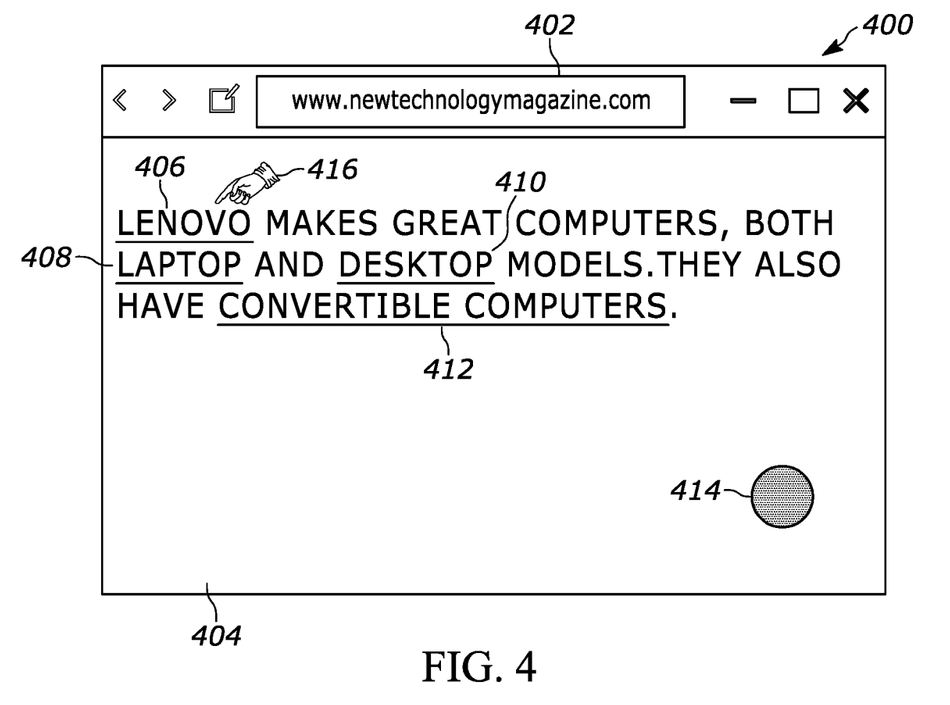

Continuing the detailed description in reference to FIG. 4, it shows another example consistent with present principles. A GUI 400 is shown in FIG. 4, which is understood to be a web browser presented on a touch-enabled display of a device operating consistent with present principles. The GUI 400 may include an input field 402 indicating a current website address for a web page 404 that is being presented on the display, with input being directable to the input field 402 if desired to change the website address and hence cause a different web page to be presented.

As shown in FIG. 4, the web page 404 includes text indicating "Lenovo makes great computers, both laptop and desktop models. They also have convertible computers." As indicated by the underlining shown in FIG. 4 for certain portions of the text, certain words may establish hyperlinks that are selectable to command the web browser to navigate away from the web page 404 and to a different web page associated with the respective hyperlink. As examples, "Lenovo" may establish a hyperlink 406 to navigate to a homepage for Lenovo, while "laptop", "desktop", and "convertible computers" may establish respective hyperlinks 408, 410, and 412 that are respectively selectable to navigate to different respective online encyclopedia entries associated with the three respective types of computers indicated in the text for the hyperlinks 408, 410, and 412.

As also shown in FIG. 4, an area of the touch-enabled display is being hovered-over by the user with his or her finger without the finger actually physically contacting the display, as may be detected using images from a camera on the device and/or using the touch-enabled display itself (e.g., using its capacitive sensors). This area is represented by outlining 414 in FIG. 4, which may or may not actually be presented on the display. Responsive to the hover being detected within a threshold non-zero height above the display and responsive to the device identifying the user as looking at a particular graphical object currently presented on the display, a translucent/semi-transparent image 416 of a finger may be presented adjacent to the graphical object and pointing toward it to indicate that this graphical object (the hyperlink 406 in this case) would be selected should the user actually bring his or her finger down from hovering to touch the display. The display location that is touched may be directly under the hover location as represented by the outlining 414, or at least located at a different location than where the graphical object itself is presented.

As indicated above, in this case the graphical object being looked at by the user is the hyperlink 406, and therefore the translucent finger 416 points to the hyperlink 406. Then once the user actually contacts the display at a different location than where the hyperlink 406 is presented but while the user concurrently looks at the hyperlink 406, the device may present the web page associated with the hyperlink 406 in response.

It is to be understood in reference to FIG. 4 that in some examples a threshold density of graphical objects all within a certain area of the display may be used, with the area being less than the entire area of the display on which images are presentable. The threshold density may be established by a threshold number of graphical objects (e.g., three) all being presented within a predetermined area of the display or all being presented within a threshold distance of each other, as is the case with the hyperlinks 406, 408, 410, and 412 in the example shown.

Thus, when a user looks at a particular object within the area of the threshold density and directs touch input to a different area of the display, a function associated with selection of the looked-at object may be executed. However, the device may decline to execute a function associated with selection of the graphical object when the looked-at object is not in an area of graphical objects meeting the threshold density (and may, in some examples, instead execute a function associated the actual display location that is touched). This may help avoid false positives where a user might be looking at one display location but still intend to select another proximate display location with touch input that does not meet the threshold density, while still executing the function in other instances when the looked-at object is in a concentrated area of graphical objects meeting the threshold density since a point of gaze using eye tracking can sometimes be a more precise mode of input than trying to touch a given graphical object with a finger that might also inadvertently touch and select adjacent graphical objects.

Figure 5:
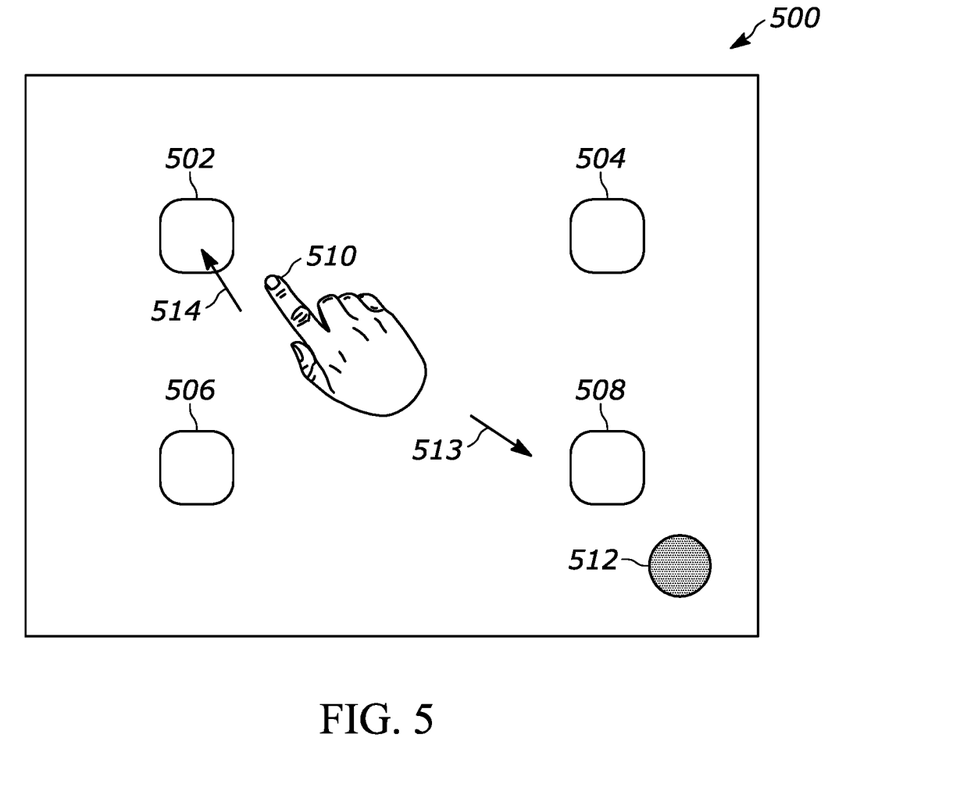

Turning now to FIG. 5, it shows yet another GUI 500 to which user input may be directed consistent with present principles. As shown, the GUI 500 may include plural respective application icons or tiles 502, 504, 506, and 508. As also shown in FIG. 5, a user's index finger 510 is currently gesturing/moving from hovering directly over at least a portion of the icon 502 to hovering over another display location/area 512 at which the finger 510 will eventually contact the display, with the movement being represented by arrow 513. The hovering/gesture may be detected using images from a camera communicating with the device and/or using input from the touch-enabled display itself. Based on the device detecting this gesture and based on the device then detecting touch input to the area 512 while the user concurrently looks at the icon 502, the device may execute a function associated with selection of the icon 502.

Additionally, note that in some examples while the gesture away from hovering over the icon 502 is being made and detected by the device, a mouse pointer 514 or other graphical object may be presented at a display location that is determined to be currently looked at by the user to indicate where a selection would be made using eye input should the user contact any other area of the display.

Detection of a gesture like the one described above may be used to determine that a function associated with selection of a looked-at graphical object can be selected for execution with a relatively higher degree of confidence since the gesture away from a graphical object that is still being looked at may indicate that the user wishes to select that graphical object but does not believe that he or she can do so accurately given the proximity or density of adjacent graphical objects that might also be inadvertently selected.

Figure 6:
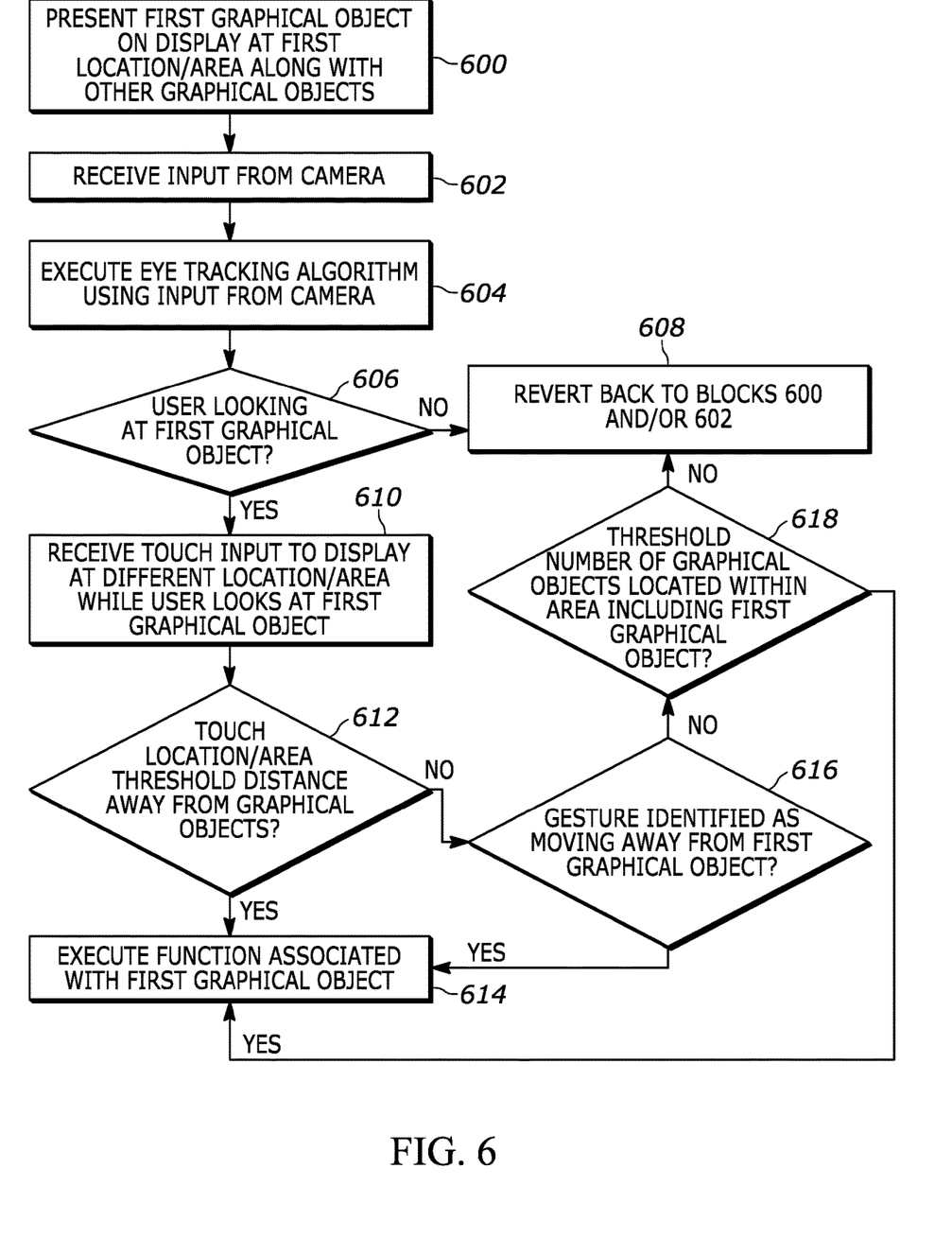
FIG. 6 shows a flow chart of an example algorithm that may be executed consistent with present principles.

Moving on to describing FIG. 6, it shows example logic that may be executed by a device such as the system 100 and/or any of the devices described above in reference to FIGS. 3-5 in accordance with present principles. Beginning at block 600, the device may present a first graphical object on a display at a first location/area along with presenting one or more additional graphical objects at other display locations/areas. The logic may then move to block 602.

At block 602 the device may receive images from a camera on or in communication with the device, such as a camera on a same side of the device as the display or a camera mounted elsewhere within the user's environment. The logic of FIG. 6 may then proceed to block 604 where the device may execute an eye tracking algorithm using the images from the camera to track the user's gaze depth and direction as may be indicated in the images. From block 604 the logic may then proceed to decision diamond 606.

At diamond 606 the device may map the user's direction of gaze to one or more display locations and determine whether the user is looking at the first graphical object. Responsive to a negative determination at diamond 606, the logic may proceed to block 608 where the logic may revert back to block 600 or block 602. However, responsive to an affirmative determination at diamond 606 the logic may instead proceed to block 610.

At block 610 the device may receive touch input to a particular location/area of the touch-enabled display while the user concurrently/simultaneously looks at the first graphical object (as tracked using the eye tracking). The location/area that is touched may be different than the area at which the first graphical object itself is presented. From block 610 the logic may then proceed to decision diamond 612.

At diamond 612 the device may determine whether the location/area of the display being touched by the user is at least a threshold distance away from at least a portion of the first graphical object that is still being looked at by the user (e.g., by comparing X-Y display coordinates of the touched location and the location of the first graphical object). An affirmative determination at diamond 612 may cause the logic to proceed to block 614, where the device may execute a function associated with selection of the first graphical object. However, a negative determination at diamond 612 may instead cause the logic to proceed to decision diamond 616.

At diamond 616, the device may determine whether a gesture of the user that might have occurred prior to receipt of the touch input at block 610 can be identified as moving away from the first graphical object while the user continued to look at the first graphical object prior to actually providing the touch input. The gesture may be identified using gesture recognition software and images from a camera on or in communication with the device that might show the gesture (e.g., the same camera as used to track the user's eye gaze direction). Additionally or alternatively, the gesture may be identified based on input from the touch-enabled display itself using its hover-sensing functionality to sense the hover movement across the display from one location to another.

An affirmative determination at diamond 616 may cause the logic to proceed to block 614 where the device may execute a function associated with selection of the first graphical object. However, a negative determination at diamond 616 may instead cause the logic to proceed to decision diamond 618. At diamond 618 the device may determine whether a threshold number of graphical objects are located within a certain display area of a threshold density that includes the first graphical object.

An affirmative determination at diamond 618 may cause the logic to proceed to block 614 where the device may execute a function associated with selection of the first graphical object based on this affirmative determination and the touch input to a different display location as received at block 610. However, a negative determination at diamond 618 may instead cause the logic to proceed to block 608. At block 608 the logic may revert back to block 600 or block 602.

Figure 7:
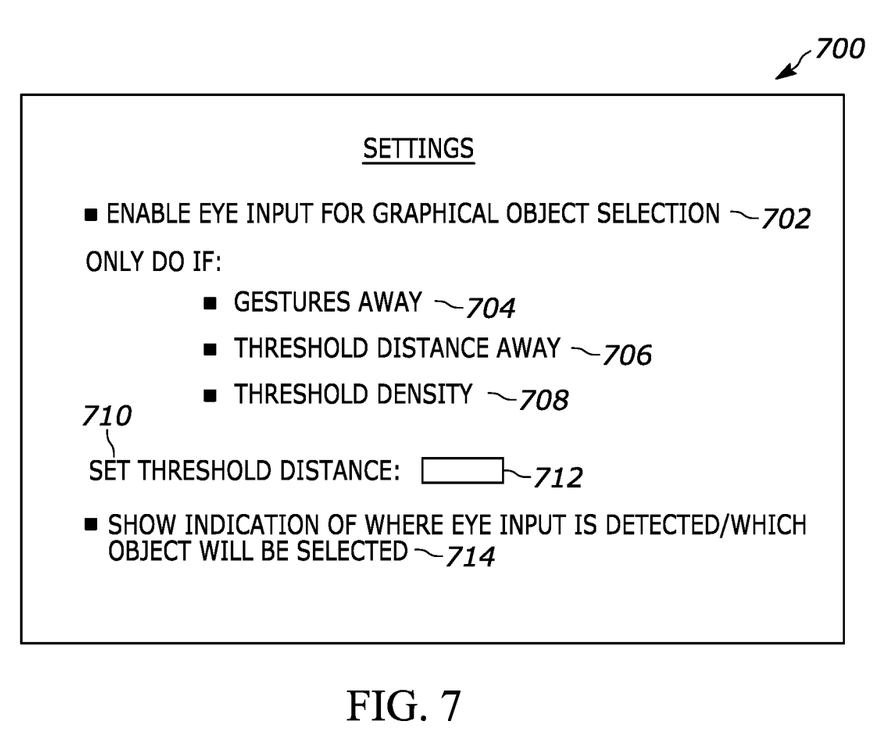
FIG. 7 shows an example GUI 700 that may be used to configure one or more settings of a device undertaking present principles.

Now describing FIG. 7, it shows a GUI 700 that may be presented on a display of a device undertaking present principles to configure one or more settings of the device to operate consistent with present principles. Each of the options/settings that will be described below may be selected by selecting the check box adjacent to the respective option, either through touch input, cursor input, or even eye input while touching another area of the display consistent with present principles.

As shown, the GUI 700 may include a first option 702 that may be selectable to enable the device to undertake present principles. For example, the option 702 may be selected to enable a setting for the device to undertake the functions described above in reference to FIGS. 3-5 as well as to execute the logic of FIG. 6.

Respective options 704, 706, and 708 may also be presented as part of the GUI 700. The options 704, 706, and 708 may be selected to respectively set the device to execute functions associated with selection of gazed-at graphical objects responsive to determinations of gestures away from gazed-at graphical objects (option 704), responsive to determinations that touch input is at least a threshold distance away from gazed-at graphical objects (option 706), and responsive to determinations that gazed-at graphical objects are located within a display area of a threshold density.

Thus, for example, option 704 may be selected to set the device to undertake the functions described above in reference to FIG. 5 and diamond 616. Likewise, option 706 may be selected to set the device to undertake the functions described above in reference to FIG. 3 and diamond 612, and option 708 may be selected may be selected to set the device to undertake the functions described above in reference to FIG. 4 and diamond 618.

As also shown in FIG. 7, the GUI 700 may include a setting 710 at which the user may set the threshold distance itself that is to be used in association with selection of the option 706. The threshold distance may be set by directing text/numerical input to box 712 to establish the threshold distance in, e.g., millimeters, centimeters, inches, etc. The numerical input itself may be provided after selecting the box 712 using a soft keyboard presented on the device's display, using voice input, etc.

Still further, in certain examples the GUI 700 may also include an option 714 that is selectable to set the device to present indicators of where a user is determined to be looking on a display and accordingly which object might be selected using touch input to another area of the display. For example, selection of the option 714 may set the device to present the indicators 306, 308, 416 and 514 at the appropriate location at the appropriate time as described herein.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a display accessible to the at least one processor;
   a camera accessible to the at least one processor; and
   storage accessible to the at least one processor and comprising instructions executable by the at least one processor to:
   present a first graphical object on the display at a first location;
   receive input from the camera;
   execute eye tracking using the input from the camera;
   identify, based on the eye tracking, a user as looking at the first graphical object at the first location;
   receive touch input to the display at a second location that is different from the first location;
   determine that the second location is at least a threshold distance away from at least a portion of the first location; and
   based on the determination that the second location is at least the threshold distance away from at least the portion of the first location and based on the identification of the user as looking at the first graphical object at the first location, execute a function associated with selection of the first graphical object.

2. The device of claim 1, wherein the instructions are executable to:
   identify a gesture by the user to move a body part of the user away from the first location; and
   based on the identification of the gesture by the user to move the body part of the user away from the first location and based on the identification of the user as looking at the first graphical object at the first location, execute the function associated with selection of the first graphical object.

3. The device of claim 2, wherein the gesture is identified based on input from the camera.

4. The device of claim 2, wherein the gesture is identified based on input from the display.

5. The device of claim 1, wherein the instructions are executable to:
   identify a body part of the user as hovering over at least a portion of the first location;
   identify a gesture by the user to move the body part away from hovering over the portion of the first location; and
   based on the identification of the gesture by the user to move the body part away from the first location and based on the identification of the user as looking at the first graphical object at the first location, execute the function.

6. The device of claim 1, wherein the instructions are executable to:
   determine that a threshold number of graphical objects are presented within an area of the display, the area comprising at least part of the first location but not comprising the entire area of the display on which images are presentable, the threshold number being greater than one; and
   execute the function based on: the determination that the threshold number of graphical objects are located within the area, the touch input, and the identification of the user as looking at the first graphical object at the first location.

7. The device of claim 1, wherein the instructions are executable to:
   execute the function without magnifying or zooming in on at least part of the first location relative to the presentation of the first graphical object at the first location.

8. The device of claim 1, wherein the function comprises one or more of: presenting a web page associated with the first graphical object, presenting a document associated with the first graphical object, launching an application associated with the first graphical object, selecting text establishing at least part of the first graphical object, selecting an input field establishing at least part of the first graphical object.

9. The device of claim 1, wherein the first graphical object comprises one or more of: a hyperlink, text, an input field, an icon selectable to launch an application, an icon selectable to present a document, a button presented as part of an application or website.

10. A method, comprising:
    presenting a first graphical object on a touch-enabled display of a device, the first graphical object being presented at a first area on the touch-enabled display;
    receiving input from a camera;
    executing eye tracking using the input from the camera;
    identifying, based on the eye tracking, that a user is looking at the first graphical object;
    receiving touch input to the touch-enabled display at a second area of the touch-enabled display, the second area not comprising the first area;
    determining that a threshold number of additional graphical objects are located within a threshold distance of the first area, the threshold number being greater than one;
    based on the touch input, based on the identifying that the user is looking at the first graphical object, and based on the determining that the threshold number of additional graphical objects are located within the threshold distance, executing a function associated with selection of the first graphical object.

11. The device of claim 1, wherein the instructions are executable to:
    present a graphical user interface (GUI) on the display, the GUI comprising an option that is selectable to enable a setting for the device to execute respective functions associated with selection of respective graphical objects based on respective determinations that respective display locations being touched are at least the threshold distance away from respective different display locations being looked at and that are associated with the respective graphical objects.

12. The device of claim 1, wherein the instructions are executable to:

present a graphical user interface (GUI) on the display, the GUI comprising a setting at which the threshold distance away is settable.

13. The method of claim 10, wherein the method comprises:

determining that the second area is at least a threshold distance away from at least a most-proximate portion of the first area; and based on the determining that the second area is at least the threshold distance away from at least the most-proximate portion of the first area and based on the identifying that user is looking at the first graphical object, executing the function associated with selection of the first graphical object.

14. The method of claim 10, wherein the method comprises:

identifying a gesture by the user to move a body part of the user away from the first area; and based on the identifying of the gesture by the user to move the body part of the user away from the first area and based on the identifying that the user is looking at the first graphical object, executing the function associated with selection of the first graphical object.

15. The method of claim 14, wherein the gesture is identified based on input from the camera and/or based on input from the touch-enabled display.

16. The method of claim 10, wherein the method comprises:

based on identifying that the threshold number of additional graphical objects are not located within the predefined distance, declining to execute the function based on the touch input and based on the identifying that the user is looking at the first graphical object.

17. At least one computer readable storage medium (CRSM) that is not a transitory signal, the computer readable storage medium comprising instructions executable by at least one processor to:

determine that a user is looking at a first area of a display;

identify movement of a body part of the user away from the first area and then identify touch input from the body part to a second area of the display, the second area being different from the first area; and based on the identification of the movement of the body part of the user away from the first area, based on the touch input, and based on the determination that the user is looking at the first area, execute a function associated with selection of the first area.

18. The CRSM of claim 17, wherein the instructions are executable to:

determine that the second area is at least a threshold distance away from at least a portion of the first area; and based on the determination that the second area is at least the threshold distance away from at least the portion of the first area and based on the determination that user is looking at the first area, execute the function associated with selection of the first area.

19. The CRSM of claim 17, wherein the identification of movement of the body part of the user away from the first area is performed based on input from a camera and/or based on input from the display.

20. The CRSM of claim 17, wherein the instructions are executable to:

determine that a threshold number of graphical objects are located within a threshold distance of the first area, the threshold number being greater than one; and execute the function based on: the determination that the threshold number of graphical objects are located within the threshold distance of the first area, the touch input to the second area, and the determination of the user as looking at the first area.

* * * * *